May 25, 1926.

F. W. R. WILLIAMS

APPARATUS FOR THE MANUFACTURE OF SUPERPHOSPHATE

Filed Jan. 10, 1921   7 Sheets-Sheet 2

Inventor
Frederick William R. Williams
By B. Singer
Atty.

May 25, 1926.

F. W. R. WILLIAMS 1,585,810

APPARATUS FOR THE MANUFACTURE OF SUPERPHOSPHATE

Filed Jan. 10, 1921   7 Sheets-Sheet 4

Patented May 25, 1926.

1,585,810

UNITED STATES PATENT OFFICE.

FREDERICK WILLIAM ROGERS WILLIAMS, OF LONDON, ENGLAND.

APPARATUS FOR THE MANUFACTURE OF SUPERPHOSPHATE.

Application filed January 10, 1921. Serial No. 436,339.

This invention relates to the preparation of superphosphate by the treatment of phosphate with an acid, and comprises a plant wherein the acid and phosphate are weighed separately and delivered into a mixer from which the mixture is discharged into a receiver provided with a disintegrating device arranged to deliver the superphosphate on to a conveyor which delivers it to a convenient place for storing and when required, for additional treatment before storing.

The acid weigher is of the kind forming the subject of application for patent Serial No. 435,188 and the automatic phosphate weigher is of the kind designed to deliver equal quantities of material at equal intervals of time, and is provided with a feeding hopper having an automatic overflow conveyor arranged to return the excess of phosphate being conveyed to the hopper of the weigher over and above that being passed over the weigher, as when the weigher is thrown out of operation. The mixer consists of a cylindrical vessel in which rotates co-axially therewith, a shaft provided with a number of arms radially arranged thereon. This central shaft is mounted in bearings in the ends of the cylindrical vessel, and the cylindrical vessel is also mounted on co-axial bearings and provided with mechanism whereby it can be rotated in order to discharge its contents through an opening provided in a side which is turned into the uppermost position during the mixing operation.

The excavator is arranged on the end of a chassis having wheels mounted on rails and provided with means for moving it along the rails. The other end of the chassis carries a framework on which is mounted a receiver consisting of hinged sides which extend downwards until they engage the sides of a block or platform fixed in the track between the rails, and having a vertical end piece of the same width and extending upwards to the height of the excavating cutters. The other end of the receiver is formed as a vertically removable door. The excavator proper consists of a rotary power driven cutter mounted on the chassis and so arranged that when the door of the receiver is raised and the chassis moved along the rails it will advance against and gradually cut away the block of superphosphate formed in the receiver on the fixed platform.

In the invention as illustrated in the accompanying drawings.

In these drawings $a$ is an acid tank, $b$ an automatic acid weigher, $a^1$ a valve-controlled pipe leading from the acid tank to the weigher, $c$ a pipe for conveying the weighed quantity of acid to a mixer $e$. $a^2$ is an open ended pipe extending from the pipe $a$ to a point above the level of the acid in the tank $a$, $a^3$ is an acid valve in the pipe $a$.

$f$ is a hopper for feeding phosphate to an automatic weigher $g$, and from which it is delivered into the feeding hopper $d$ of the mixer $e$.

$h$ is a hopper for delivering the contents of the mixer $e$ into a receiver $i$ from which it is excavated by a rotary cutting disintegrator $j$ and discharged onto a delivery conveyor $m$.

The receiver $i$ and the rotary excavating cutter $j$ are mounted on a chassis $k$ having wheels $k^1$ running on rails $k^2$, and admitting of a traverse of the excavating cutter sufficient to deal with the full length of the block of superphosphate within the receiver $i$. The receiver consists of a fixed bottom $n$ of concrete and end wall $n^1$ arranged between the rails $k^2$. The inner side of the fixed end wall $n^1$ is curved to the same curvature as formed by the cutting edges of the rotary excavator so as to enable the excavator to deal with the whole of the block of superphosphate formed in the receiver. The sides $i^2$, $i^3$ of the receiver are hinged to a framework $k^3$ and are held in position with their lower edges against the sides of the concrete bottom $n$ and end wall $n^1$ by means of locking members such as clamping screws or wedges arranged between them and the framework $k^3$, the vertically movable end door $i^4$ being detachably held in position against the side members $i^2$, $i^3$ in a similar manner. The excavating cutter $j$ consists of a number of cutters $j^1$—$j^1$ carried by radial arms $j^s$—$j^3$ secured to a vertical shaft $j^4$ mounted in bearings in a framing $k^3$ on the chassis $k$. These radial arms $j^3$—$j^3$ also carry a number of fan blades $j^2$—$j^2$ adapted to pass a current of air over the face of the superphosphate during the rotation of the cutters so as to remove moisture therefrom. On the shaft $j^4$ is secured a bevel wheel $k^4$ gearing with a bevel pinion $k^5$ mounted on a shaft driven by means of belt and pulley gear $k^6$—$k^6$ from an electric motor $k^7$.

The chassis $k$ of the receiver $i$ and rotary excavator $j$ is traversed on the rails $k^2$ by means of racks $k^8$, $k^8$ operated by worms $k^9$, $k^9$ rotated by bevel gearing $k^{10}$ driven by the power belt pulleys $k^{11}$, $k^{12}$, which are of different diameters so that a quick return of the chassis can be effected when the belt is moved on to the small pulley $k^{11}$.

As the rotary excavator gradually cuts away the block of superphosphate it delivers the cut material on to the conveyor $m$.

Figure 3:
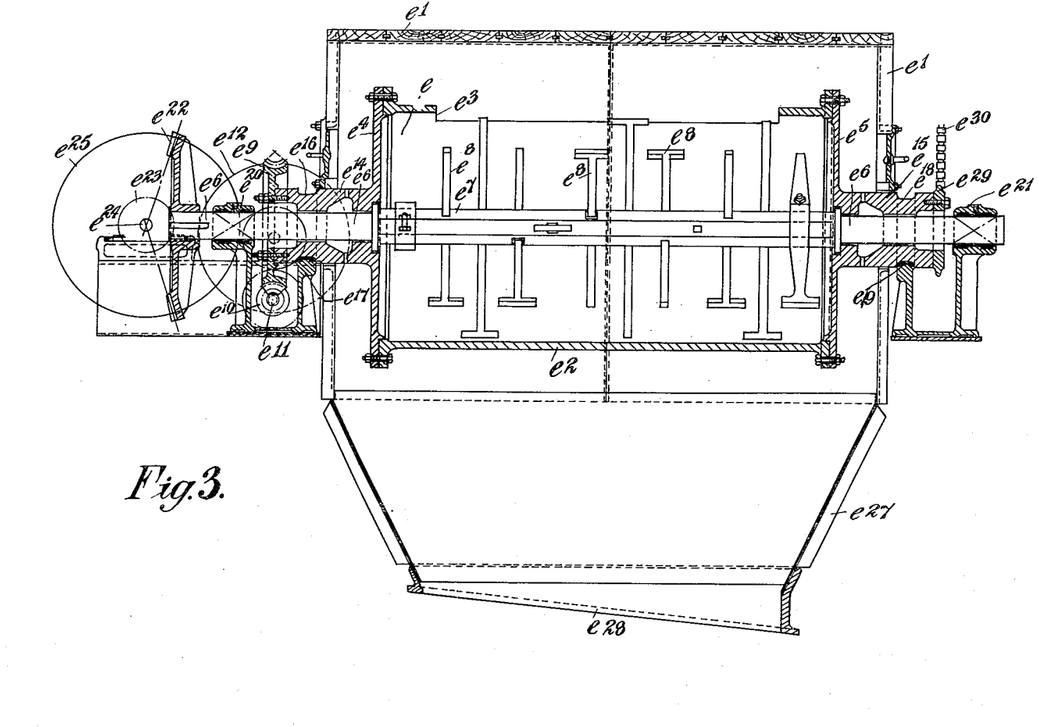
Fig. 3 is a sectional elevation.
Figure 4:
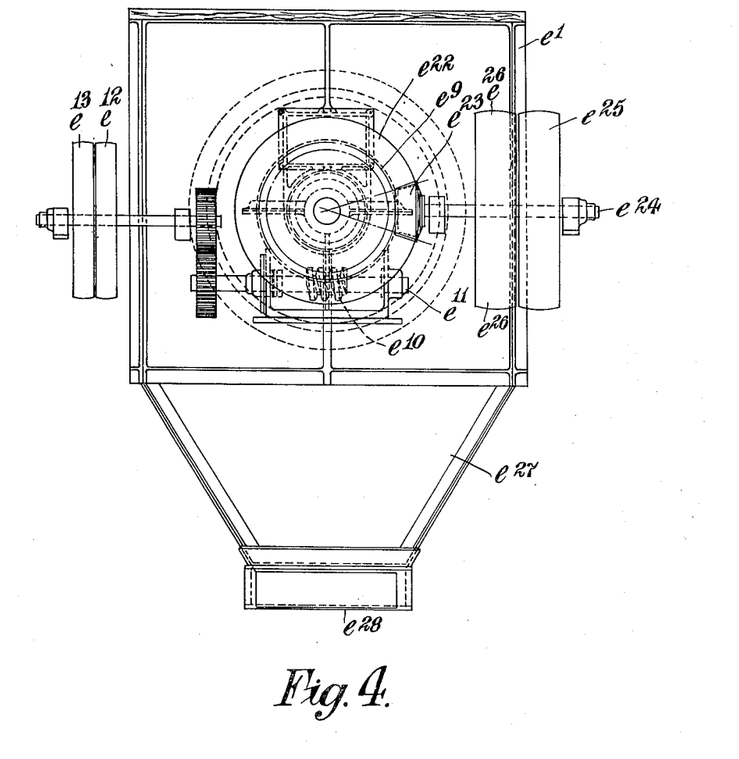
Fig. 4 an end view and Fig. 5 a plan of the mixer.
Figure 5:
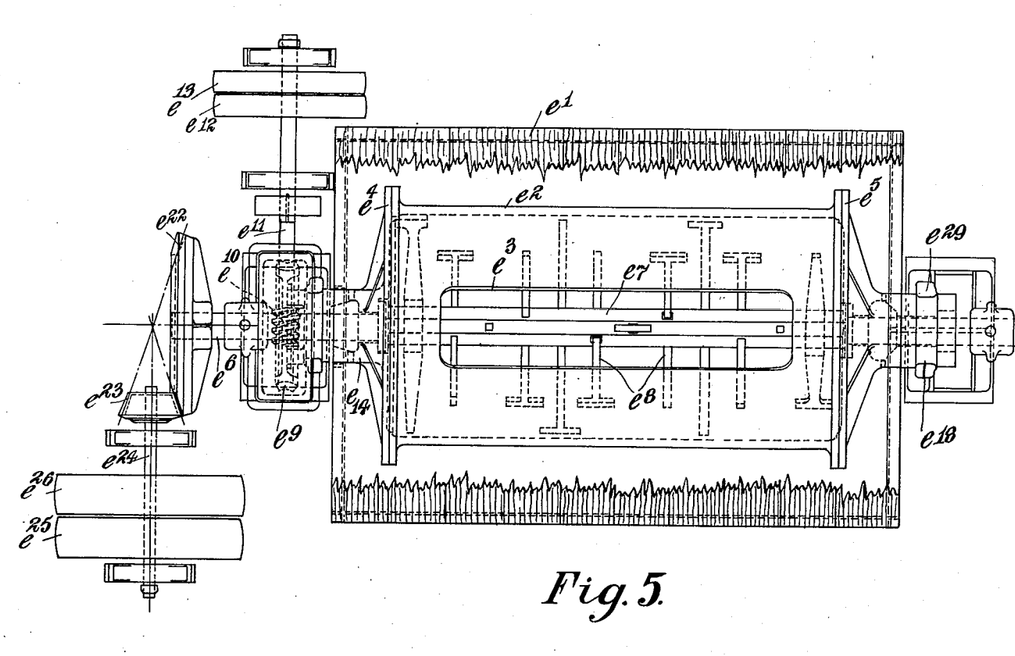

The mixer $e$, (see Figures 3, 4 and 5) is provided with an outer casing $e^1$, and its main elements comprise a cylindrical drum $e^2$ having an opening $e^3$. The end members $e^4$, $e^5$ of the drum are bored to allow of a shaft $e^6$ extending right through the axis of the drum. Secured on the portion of the shaft $e^6$ within the drum $e$ is a sleeve $e^7$ from which extend radially a number of beater arms $e^8$—$e^8$. The boss $e^{14}$ of the end $e^4$ of the drum $e$ extends through the casing $e^1$ and has a journal $e^{16}$ formed on it adapted to bear on a bearing $e^{17}$. On the end of the boss $e^{14}$ is secured a worm wheel $e^9$ arranged to gear with a worm $e^{10}$ mounted on a shaft $e^{11}$ adapted to be driven from a source of power by the fixed driving pulley of the pair of fast and loose driving pulleys $e^{12}$, $e^{13}$. The boss $e^{15}$ of the end $e^5$ of the drum $e$ extends through the casing $e^1$ and has a journal $e^{18}$ formed on it to run on a bearing $e^{19}$. The shaft $e^6$ is mounted in bearings $e^{20}$ and $e^{21}$, and on its end is secured a bevel wheel $e^{22}$ gearing with a bevel pinion $e^{23}$ secured on a shaft $e^{24}$ driven by the fixed pulley of a pair of power driven pulleys $e^{25}$, $e^{26}$.

Figure 1:
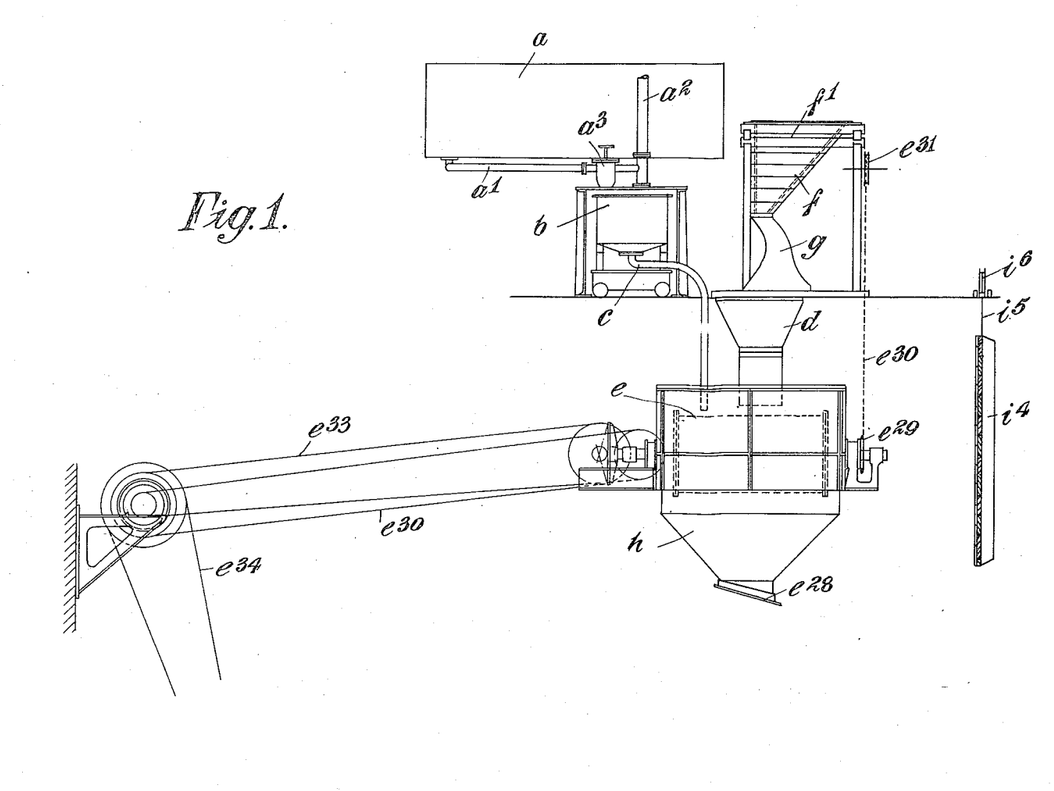
Figs. 1 and 1ª comprise a general elevation of the apparatus showing the relative positions of the weighers, mixers, receiver and excavator, a portion of the front side of the receiver being broken away to show the fixed end member of the receiver.
Figure 1A:
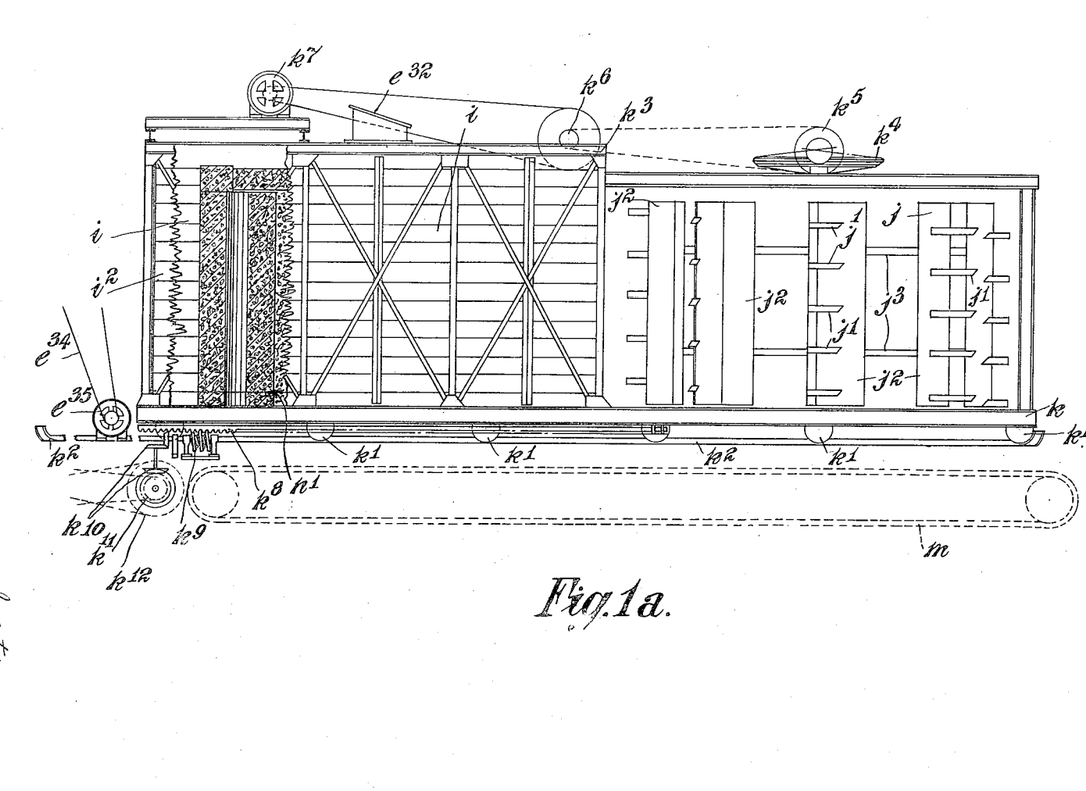
Figure 2:
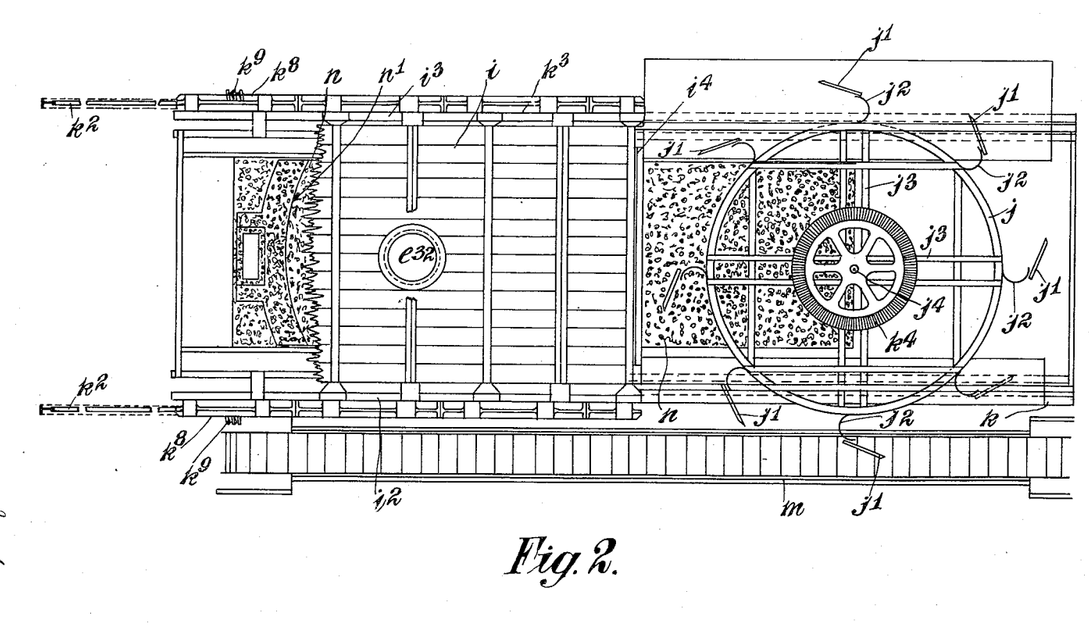
Fig. 2 is a plan of Fig. 1ª.

$e^{27}$ is a delivery hopper secured to the mixer casing $e^1$, and provided with an inclined outlet $e^{28}$ adapted to register with a similarly shaped inlet $e^{32}$ formed on the top of the receiver $i$ (see Fig. 1$^a$).

$e^{29}$ is a chain wheel adapted to drive by means of a chain $e^{30}$ an indicating wheel $e^{31}$ arranged near the acid and phosphate weighers.

Figure 6:
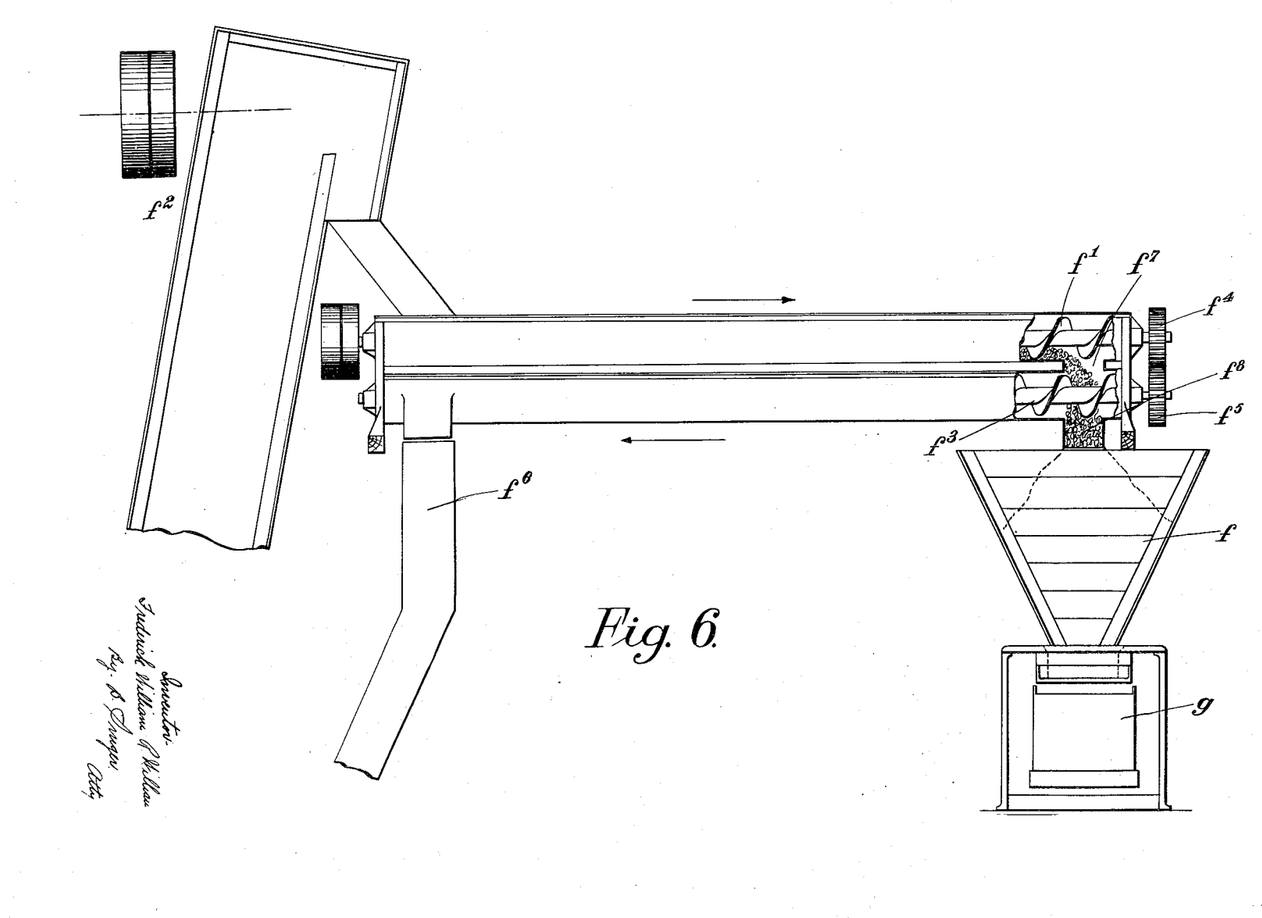
Fig. 6 is a view of the conveyor for feeding phosphate to the weigher.

In Fig. 6, $f^1$ is a screw conveyor for feeding the phosphate brought up from the storage bin by the conveyor $f^2$, into the hopper $f$ of the automatic weigher $g$. Immediately under the screw conveyor $f^1$ and parallel to it is arranged a second screw conveyor $f^3$ geared to the conveyor $f^1$ by gear wheels $f^4$, $f^5$ so that it will be rotated in the opposite direction to $f^1$, any surplus phosphate not passing through the hopper $f$ will therefore be returned along the conveyor $f^3$ and back down the chute $f^6$ to the storage bin. It will thus be seen that these conveyors can be kept in continuous operation and at the same time prevent waste which might otherwise be due to variations in speed of, or cessation of, the weighing operations.

During the working of the plant the phosphate is conveyed from the storage bin by the elevating conveyor $f^2$ into the worm conveyor $f^1$ which delivers the material through the outlets $f^7$ and $f^8$ into the hopper $f$ from which it is delivered to the automatic weigher $g$ from which it is discharged through the hopper $d$ into the mixer $e$. The acid from the storage tank $a$ passes through a pipe $a^1$ into the acid weigher $b$ from which it is discharged through the pipe $d$ into the mixer $e$.

The weighed quantities of the acid and phosphate pass through the drum opening $e^3$ which is turned into the uppermost position by means of the worm and worm wheel gear $e^{10}$ and $e^9$, and the fixed member of the power pulleys $e^{12}$, $e^{13}$. The mixer arms $e^8$—$e^8$ are now rotated by means of the bevel gear $e^{22}$ and $e^{23}$ and power pulleys $e^{25}$ and $e^{26}$. These pulleys are driven by belt gearing $e^{33}$ and $e^{34}$ and an electric motor $e^{35}$. The same motor is arranged to drive the power pulleys $e^{12}$ and $e^{13}$ by means of the belt gearing $e^{30}$ and $e^{28}$.

After the mixer has been in operation a sufficient length of time to produce a mixture of the desired consistency the drum rotating gear is operated sufficiently to bring the opening $e^3$ of the drum into its lowest position and so discharge the mixture through the hopper $h$ and outlet $e^{28}$ and inlet $e^{32}$ into the receiver $i$, the chassis $k$ having been previously moved along the rails $k^1$ into such a position as to bring the inlet $e^{32}$ and the outlet $e^{28}$ into register. When the receiver is in this position the hinged sides $i^2$, $i^3$ of the receiver are fixed against the sides of the concrete slab $n$ and the end door $i^4$ of the receiver lowered into position on the concrete slab $n$, and wedged tightly against the sides $i^2$ and $i^3$.

After the mixed phosphate has been allowed to stand a sufficient length of time to produce superphosphate of the desired consistency, the end door $i^4$ is raised above the framing $k$, this is effected by means of a cable and pulley gear $i^5$, $i^6$, the sides $i^2$, $i^3$ are then loosened and the traversing gear and also the excavator rotating motor $k^7$, set in operation. The block of superphosphate is held while the traversing chassis advances the cutter gradually into it which removes the cut material on to the conveyor $p$. At the end of the cutting operation the traverse of the chassis is reversed until the inlet $e^{32}$ on the top of the receiver is brought into register with the outlet $e^{28}$, and the mixing and filling operations repeated until the receiver is again charged.

What I claim and desire to secure by Letters Patent is:—

1. Apparatus for the preparation of superphosphate, comprising an acid tank, an acid weighing machine, a phosphate weighing machine, a mechanical phosphate feeder to the weighing machine having means for returning to the supply superfluous phosphate fed to the weigher, a mechanical mixer, a mixture receiver having a traversing portion provided with an inlet, means for discharging the mixture from the receiver, means for traversing the traversing portion of the receiver, and valve-controlled pipes for supplying acid to the weighing machine and weighed quantities therefrom to the mixer, the valves for controlling the delivery of the acid from the acid tank to the weighing machine and to the mixer being arranged to be operated by hand, the traversable portion of the receiver being disconnectible from the mixer.

2. Apparatus for the preparation of superphosphate, comprising an acid tank, a valve-controlled outlet leading from said acid tank to the weighing pan of a weighing machine, an automatic phosphate weigher, a mixer, a charging inlet to said mixer communicating with the said weighers, a pipe connection leading from said acid weigher to said mixer, a mixture receiver having a traversing portion provided with an inlet, means for discharging the mixture from the receiver, means for traversing the traversing portion of the receiver, means for opening and closing said connection periodically to permit of the weighing and discharge operations respectively, the traversable portion of the receiver being disconnectible from the mixer and traversed during the discharge of the mixture from the receiver.

3. Apparatus for the preparation of superphosphate, comprising an acid tank, an automatic acid weigher, a phosphate weigher, a mixer, a superphosphate receiver, means for discharging the mixture from the receiver, means for controlling the supply of acid from said acid tank to the pan of the automatic acid weigher, and means for supplying the weighed acid and phosphate to the mixer, an open ended pipe between the valve and pan of the acid weigher and extending above the acid in the tank, a mixture receiver having a traversing portion provided with an inlet, means for discharging the mixture from the receiver, means for traversing the traversing portion of the receiver, the means for discharging the acid and phosphate from the weighers being arranged to discharge separately into the mixer, and the mixer to discharge into the receiver through the inlet in the traversable portion of the receiver when the receiver is at rest and not discharging.

4. Apparatus for the preparation of superphosphate, comprising an acid weigher, a phosphate weigher associated with a hopper having a feeding conveyor and a surplus return conveyor, so that the feeding conveyor can operate continuously while the weigher operates intermittently, a mixture receiver having a traversing portion provided with an inlet, means for discharging the mixture from the receiver, means for traversing the traversing portion of the receiver, and a mixer adapted to receive charges from both weighers and discharge its contents in the receiver, the traversable portion of the receiver being disconnectible from the mixer and traversed during the discharge of the mixture from the receiver.

5. Apparatus for the preparation of superphosphate, comprising an acid weigher, a phosphate weigher, a rotatable cylindrical mixing vessel provided at each end with a hollow coaxial extension mounted in bearings, one extension being provided with a worm wheel gearing with a power driven worm, power driven rotary mixing arms arranged coaxially within the cylindrical vessel, a mixture receiver having a traversing portion provided with an inlet, means for discharging the mixture from the receiver, means for traversing the traversing portion of the receiver, and means for delivering the weighed acid and phosphate into the receiver, the traversable portion of the receiver being disconnectible from the mixer and traversed during the discharge of the mixture from the receiver.

6. Apparatus for the preparation of superphosphate, comprising an acid weigher, a phosphate weigher, a rotatable cylindrical mixing vessel provided at each end with a hollow coaxial extension mounted in bearings, one extension being provided with a worm wheel gearing with a power driven worm, power driven rotary mixing arms secured to a driving shaft passing through the extensions of the cylindrical vessel and having its projecting ends mounted in bearings, a mixture receiver having a traversing portion provided with an inlet, means for discharging the mixture from the receiver, means for traversing the traversing portion of the receiver, and means for delivering the weighed acid and phosphate into the receiver, the traversable portion of the receiver being disconnectible from the mixer and traversed during the discharge of the mixture from the receiver.

7. Apparatus for the preparation of superphosphate, comprising an acid weigher, a phosphate weigher, a mixer adapted to receive acid and phosphate from the weighers, a rectangular receiver having fixed end and bottom portions, a removable end, and side and top members mounted on a chassis on which is also mounted means for discharging the mixture and which is provided with traversing mechanism and disconnectible means for discharging the contents of the mixer into the receiver, when the traversing mechanism is at rest and the mixture discharging means inoperative.

8. Apparatus for the preparation of superphosphate, comprising an acid weigher, a phosphate weigher, a mixer adapted to receive the acid and phosphate from the weighers, means for discharging the mixture from a receiver mounted on a power operated chassis on which is also mounted side and top members of the receiver which fit against the sides of a fixed bottom and of an end member, the other end member being a vertically removable one, and disconnectible means for delivering the weighed acid and phosphate into the receiver when the traversing mechanism is at rest and the mixture discharging means inoperative.

9. Apparatus for the preparation of superphosphate, comprising an acid weigher, a phosphate weigher, a mixer adapted to receive acid and phosphate from the weighers, and a rectangular receiver having one fixed end extending vertically from a fixed bottom, a removable end and a traversing chassis carrying means for discharging the mixture and side and top members of the receiver, an inlet in the said top member having an inclined opening adapted to register with a similarly inclined opening on the delivery outlet of the mixer, so as to form disconnectible means for discharging the contents of the mixer into the receiver when the traversing mechanism is at rest and the mixture discharging means inoperative.

In witness whereof I affix my signature.

FREDERICK WILLIAM ROGERS WILLIAMS.